United States Patent [19]

Manesse et al.

[11] Patent Number: 4,585,369
[45] Date of Patent: Apr. 29, 1986

[54] MECHANICAL CONNECTION MEANS

[75] Inventors: Jean-Pierre Manesse, Basse Goulaine; Jacques Angibaud, Nantes, both of France

[73] Assignee: Alsthom-Atlantique, Paris, France

[21] Appl. No.: 675,389

[22] Filed: Nov. 28, 1984

[30] Foreign Application Priority Data

Dec. 1, 1983 [FR] France ................. 83 19213

[51] Int. Cl.[4] .................. B25G 3/18; F16B 21/00
[52] U.S. Cl. .................. 403/322; 403/317;
403/326; 294/86.15; 294/86.33; 279/74;
279/87; 405/170; 405/224; 166/338; 166/340
[58] Field of Search ......... 403/322, 326, 325, 317,
403/31; 294/86.15, 86.16, 86.17, 86.26, 86.27,
86.33; 279/82, 87, 74, 66; 405/169, 170, 171,
224; 166/338–343

[56] References Cited

U.S. PATENT DOCUMENTS

| | | | |
|---|---|---|---|
| 1,112,349 | 9/1914 | Barnes | 279/74 |
| 3,354,951 | 11/1967 | Savage et al. | 166/341 |
| 3,493,043 | 2/1970 | Watkins | 166/341 |
| 3,553,821 | 1/1971 | Postlewaite | 166/342 X |
| 3,721,462 | 3/1973 | Pawlitzki | 403/322 X |
| 4,347,012 | 8/1982 | Glidden | 403/326 X |
| 4,405,263 | 9/1983 | Hall | 405/224 |
| 4,439,068 | 3/1984 | Pokladnik | 166/338 X |
| 4,469,136 | 9/1984 | Watkins | 166/340 X |

FOREIGN PATENT DOCUMENTS 588238 12/1959 Canada ................. 403/325

Primary Examiner—Cornelius J. Husar
Assistant Examiner—Todd G. Williams
Attorney, Agent, or Firm—Sughrue, Mion, Zinn, Macpeak and Seas

[57] ABSTRACT

This connection means comprises a male connector (1) with a circular groove (5) and a female connector comprising a body (2), a cap (3) and a sleeve (4). The cap (3) hangs from the bottom end of body 2 within which it is able to partly slide. The cap has a bearing surface (7) bearing on the male connector (1) and its bottom part (9) covers the male connector. This bottom part is provided with a circular series of openings (10) each equipped with a finger (11) operable to slide radially. These fingers cooperate with windows (27) in a conical wall (26) of the sleeve (4). Connection is made by gravity, by body 2 pushing down on sleeve 4, which slides downward causing the fingers (11) to slide radially inward. Disconnection is accomplished by sending oil pressure through purposely provided channels (35, 33, 30) into a chamber (20), causing the sleeve (4) to slide up and the fingers (11) to retract. The invention finds particular application in the anchoring of tethers for buoyant marine platforms anchored by means of vertical tethers.

5 Claims, 4 Drawing Figures

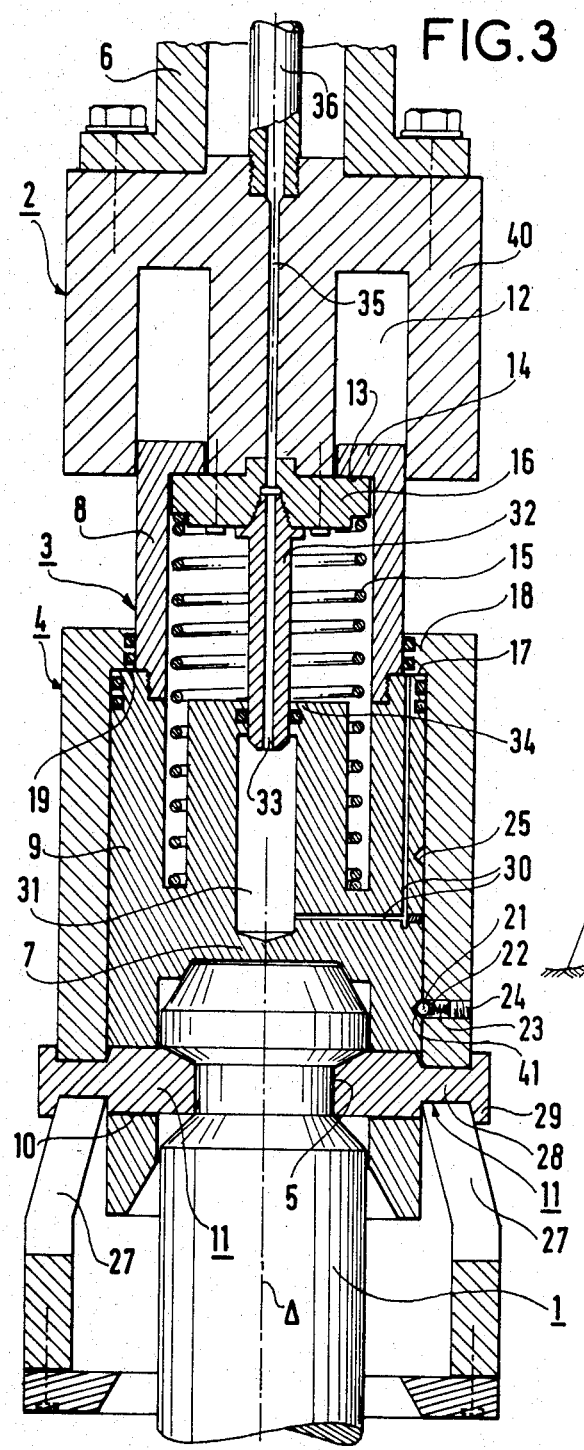
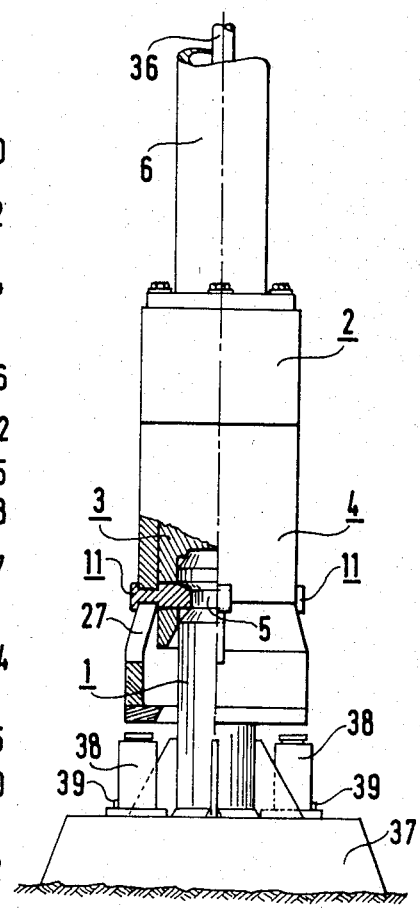
FIG.3
FIG.4

MECHANICAL CONNECTION MEANS

This invention concerns a means of mechanical connection for joining a substantially vertical tension line or tether to a tether anchoring point.

The invention finds particular application in, but is not limited to, floating marine platforms anchored by means of vertical tethers each attached on the sea bed by means of a connection means.

The connection means according to the invention comprises a female connector and a male connector, said male connector being part of the anchor and comprising a cylindrical part provided with a circular groove, and is characterized in that the axis of the male connector is vertical, the female connector capping and overlapping the male connector from above and comprising a body, a cap and a sleeve, said body being fastened to the lower end of said tether, said overlapping cap consisting of a hollow cylinder open at both ends and comprising an inside wall for bearing on the top end of said male connector, said wall dividing the cap into a top part and a bottom part, said bottom part being provided with a circular series of radial openings issuing, when the cap is in bearing position, into said groove, each opening being equipped with a radially sliding finger, the top part being suspended and free to slide axially inside a first annular chamber provided in said body, said sleeve surrounding said cap and being suspended, when lowered, from a shoulder on said cap, the axial sliding of said sleeve relative to said cap from this position creating a second annular chamber between the outside wall of the top part of the cap, the inside wall of the top part of the sleeve, the said shoulder and a step in the bore of the sleeve, said fingers and the sleeve having cooperating means so that the axial movement of the sleeve relative to the cap will cause the fingers to slide radially in or out depending on the direction of said relative axial movement, said cap containing a first hydraulic fluid input channel one end whereof issues at the level of the said shoulder and the other end whereof issues in said top part of said cap, said first channel being continued by a second channel bored into said body, the bottom end whereof issues into said top part of the cap and the top end whereof issues outside the body where it connects to a hydraulic line.

The cap and the sleeve can advantageously be provided with load-limiting retaining means for keeping the sleeve raised in relation to the cap, i.e. in the position wherein the fingers are withdrawn from said groove.

According to a preferred embodiment of the invention, a nozzle tube is centered in the bottom end of the body, the bottom end of said nozzle tube sliding axially and in a fluid-tight manner within a blind hole provided in a bulge, which serves as a bearing, in said wall of the cap, said first channel issuing into the base of said hole and said nozzle tube having a center bore providing a link between the first and the second channel, the second channel being a center bore in said body, said tether consisting of hollow tubes wherethrough runs said fluid line.

BRIEF DESCRIPTION OF THE DRAWINGS

The invention will be more readily understood in light of the following description of one embodiment thereof, made with reference to the appended drawing wherein:

FIG. 3 shows a cutaway view of the connection means in connected position, with the tether under tension; and FIG. 4 is an outside view showing the anchoring of the male connector, together with an emergency disconnecting system.

DESCRIPTION OF THE PREFERRED EMBODIMENT

Figure 1:
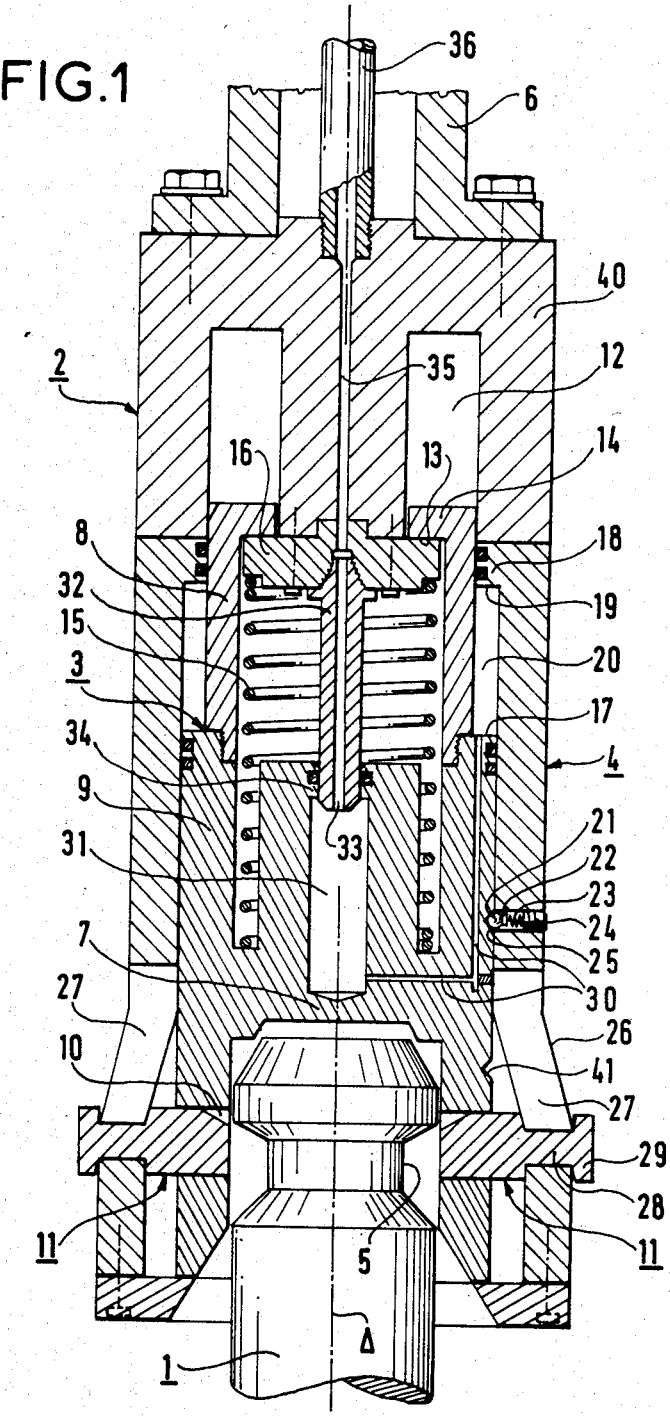
FIG. 1 shows a cutaway view of the connection means in disconnected position.
Figure 2:
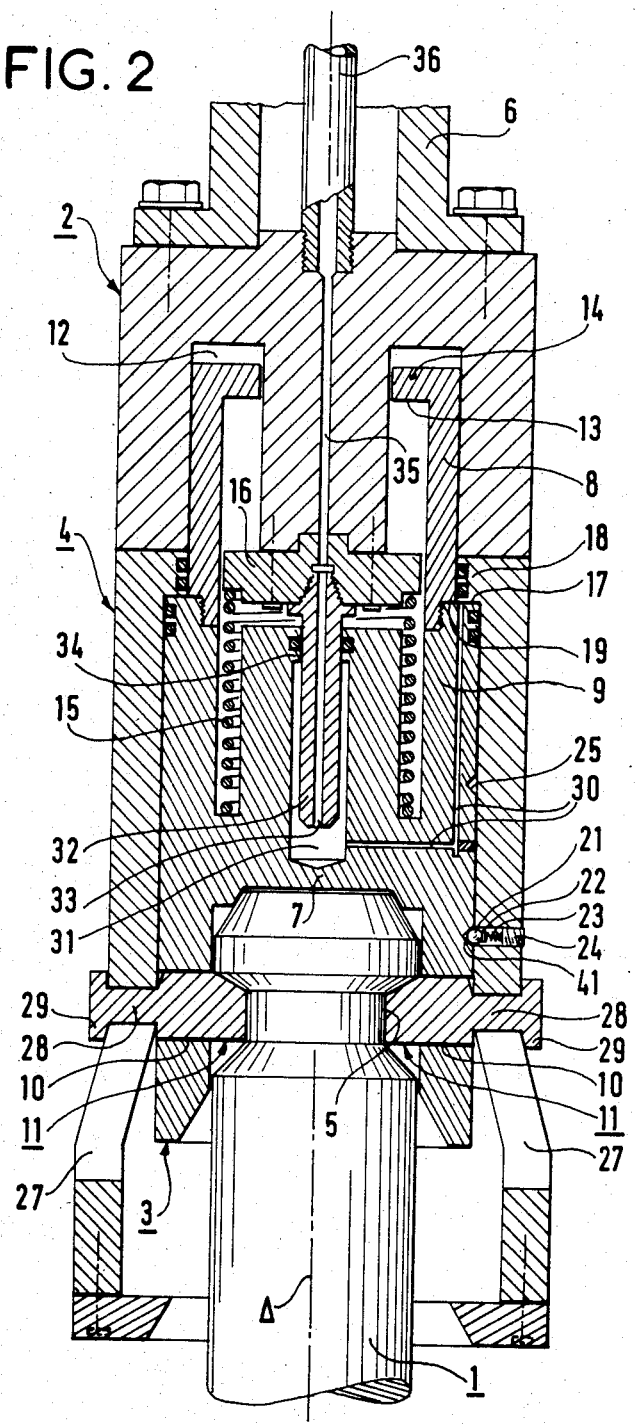
FIG. 2 shows a cutaway view of the connection means in connected position.

Referring to FIGS. 1, 2 and 3, the connection means consists of a cylindrical male connector 1, comprising a vertical-axis entry cone solidly attached to its anchor (see FIG. 4), and a female connector comprising three basic parts: a body 2, an overlapping cap 3 and a sleeve 4, all cylindrical. The male connector 1 has a circular groove 5.

Body 2 is attached to the bottom end of a tether 6, which in the case at hand is tubular.

The overlapping cap 3 consists of a hollow cylinder divided by an inside wall 7 into a top part 8 and a bottom part 9. The bottom 9 part of the cap is provided with an annular series of radial openings 10 each equipped with a sliding finger 11. The bottom part of the cap bore ends in a cone. The top part 8 of the cap fits into and can slide within an annular chamber 12, termed the first chamber, open at the bottom, provided in body 2. When in lowered position, as illustrated in FIG. 1, the cap hangs from the lower bottom 13 of the chamber by means of an annular supporting surface 14 at the top end of the cap 3. A spring 15 provided in the top part 8 of the cap pushes against the inside wall 7 of the cap and the bottom 16 of the center part of body 2. This spring tends to push the cap downwards as shown in FIG. 1.

The sleeve 4 surrounds the cap 3 such that these two parts can slide axially relative to one another. The diameter of the top part 8 of cap 3 is slightly narrowed, thus providing a shoulder 17. Similarly, the top end of sleeve 4 ends in an inward projection 18 providing an inward shoulder 19.

When in the lowered position of the sleeve 4 relative to the cap 3, as illustrated in FIGS. 2 and 3, the sleeve 4 rests, by means of its shoulder 19, on shoulder 17 of cap 3.

The upward sliding of sleeve 4 relative to cap 3 thus opens an annular chamber 20, termed the second chamber.

Load-limited retaining means are provided to hold up the sleeve when in the raised sleeve 4 position relative to cap 3 (FIG. 1), the sleeve at this time being under it own load and lacking any support.

These means consist of one or more device like the one shown in the figures, comprising a ball 21, thrust forward, by a piston 22 loaded by a spring 23 secured by a screw 24, into a notch 25 in the cap.

The bottom part of sleeve 4 includes a conical section 26 provided with a circular series of oblong windows 27.

The centerline of each window lies in a plane passing through the axis Δ of the connection means. These windows 27 match up with the openings 10 on the cap 3. Each finger 11 has a tail 28 going through a matching window 27 and ends in a flared section 29 wider than the window serving to restrict the finger to a radial movement perpendicular to the axis Δ when the sleeve and cap slide axially relative to one another.

As is apparent from the figures, the cap 3, for manufacturing purposes, is made of two assembled parts. Similarly, the bottom 16 of body 2 is fitted to the latter.

A channel 30 is provided in the cap 3, one end of said channel issuing at shoulder 17 in chamber 20 and the other end issuing into a blind center bore 31 in wall 7, drilled down from the top surface of the wall. A nozzle tube 32 having a center bore 33 is screwed into the center of bottom 16 of body 2 and penetrates the blind center bore 31 by sliding in a fluid-tight manner within a part 34 forming a guide bushing.

Center bore 33 of nozzle tube 32 is continued by a center bore 35 in body 2 the end whereof is screwed to the end fitting of a hydraulic line 36. The top end of this hydraulic line 36 is connected to oil pressuring means.

In the example of utilization for the seabed anchoring of a buoyant platform by means of tethers, the male connector 1 is solidly anchored at the bottom of the sea to an anchoring slab 37 (FIG. 4) and emergency disconnect jacks, such as 38, whose role will be made apparent hereinafter, are arranged around the male connector 1. These jacks 38 comprise a hookup connector 39 for supplying them with oil. The connection means operates as follows:

FIG. 1 shows the connection means in its disconnected state. The cap 3 hangs from the bottom 16 of body 2 and the sleeve 4 is raised, while the fingers 11 are retracted.

In continuing the descent of the tether, there comes a time when the cap 3, through its wall 7, comes to rest on male connector 1. The cap is immobilized at this point. However, due to the weight of the tether and of body 2, the unit as a whole can still descend by compressing spring 15, with the top part 8 of cap 3 sliding in annular chamber 12, nozzle tube 32 sinking into the blind borehole 31 and the lower outside part 40 of body 2 pushing down on the sleeve with a force greater than the holding force of retaining means 21, 25, 23. During the lowering of the sleeve, the fingers 11, guided by the windows 27, slide radially towards axis Δ, penetrating the groove 5. This leads to the position shown in FIG. 2, in which connection is made. In this position, the sleeve retaining ball penetrates into notch 41 to hold the sleeve in this new position.

Thereafter, due to the tension on the tether, the latter moves upwardly together with body 2, while the sleeve and the cap remain stationary, until the position illustrated in FIG. 3 is reached, wherein the tensile stress is applied between annular part 14 of the cap and the bottom 16 of body 2.

Throughout this connecting operation, the mating cones of male connector 1 and cap 3 obviously facilitate their coupling approach. It is apparent from the drawing that the connection takes place by sheer gravity.

Disconnection normally takes place as follows:

The tension on the tether is eased until body 2 comes to rest upon sleeve 4. Then, pressurized oil is sent through line 36. This has the effect of raising sleeve 4 relative to cap 3, thus retracting the fingers 11. The sleeve resumes its raised position and is held thus by ball 21 in notch 25.

The unit as a whole can then be pulled up by pulling up the tether.

As a safety precaution, the hydraulic pressure is maintained while the tether is being pulled up.

Should disconnection fail to occur for any reason, such as due to an oil leak for example, disconnection can be achieved with the help of an underwater machine equipped with a hydraulic plant with a plurality of hoses and an articulated outside arm. This machine connects up with each jack and their pressurization causes the sleeve 4 to move back up and the fingers 11 to retract.

During the approach phase of connection, it is necessary to have the sleeve 4 in raised position so that the fingers are retracted. This is why a spring-loaded ball and notch retaining system has been provided. Nevertheless, it could be possible to achieve the same goal without this system, by maintaining an oil pressure in chamber 20 at coupling time and removing said pressure as soon as connection has been accomplished.

Similarly, a nozzle tube 32 has been provided for continutiy between channels 30 and 35, but this, also, is not absolutely indispensable. Alternatively, a seal should be provided between the bottom 16 of body 2 and the top part 8 of the cap.

Spring 15 also, is not absolutely indispensable, although it ensures that the cap will always be lowered for the coupling approach. In the event that a nozzle tube 32 is not utilzied, this spring 15 becomes much more necessary as a means of overcoming the friction of the seals.

What is claimed is:

1. Mechanical connection means for joining a substantially vertical tension line, or tether, to a tether anchoring point, comprising a female connector and a male connector, said male connector being part of the anchor and comprising a cylindrical part provided with a circular groove, wherein said connection means the male connector is vertical, the female connector capping and overlapping the male connector from above and comprising a body, a cap and a sleeve, said body being fastened to the lower end of said tether, said cap consisting of a hollow cylinder open at both ends and comprising an inside wall for bearing on the top end of said male connector, said wall dividing the cap into a top part and a bottom part, said bottom part being provided with a circular series of radial openings issuing, when the cap is in bearing position, into said groove, each opening being equipped with a radially sliding finger, the top part being suspended and free to slide axially inside a first annular chamber provided in said body, said sleeve having a bore surrounding said cap and being suspended, when lowered, for a shoulder on said cap, the axial sliding of said sleeve relative to said cap from this position creating a second annular chamber between the outside wall of the top of the cap, the inside wall of the top part of the sleeve, said shoulder and a step in said bore of said sleeve, said fingers and said sleeve having cooperating means so that the axial movement of the sleeve relative to the cap will cause the fingers to slide radially in or out depending on the direction of said relative axial movement, said cap containing a first hydraulic fluid input channel one end whereof issues at the level of the said shoulder and the other in said top part of said cap, said first channel being continued by a second channel bored into said body, the bottom end whereof issues into said top part of the cap and the top end whereof issues outside the body where it connects to a hydraulic line.

2. Mechanical connection means according to claim 1, having a spring inside the top part of said cap, the bottom of said spring pushing against said inside wall of the cap and the top of said spring pushing against the bottom part of said body.

3. Mechanical connection means according to claim 1, having a nozzle tube centered in the bottom of said body, the bottom end of said nozzle tube sliding axially and in a fluid-tight manner within a blind hole bored into a bulge, which serves as a bearing, in said wall of the cap, said first channel issuing at the base of said borehole and said nozzle tube having a center bore channel providing a link between the first and the second channels, the second channel being a center bore in said body, said tether consisting of hollow tubes for running said fluid line therethrough.

4. Mechanical connection means according to claim 1, wherein said cooperating means between the fingers and the sleeve include, for each finger, a tail going through a window in a conical section of said sleeve, the centerline of the window lying in a plane passing through the axis of the connection means, said tail ending in a flared section which is wider than the window.

5. Mechanical connection means according to claim 1, wherein the cap and the sleeve are provided with limited-load retaining means, consisting of a ball, a piston, a spring, a screw and a notch, to hold the sleeve in raised position relative to the cap, in which position and fingers are withdrawn from said groove.

* * * * *